United States Patent Office 2,970,806
Patented Feb. 7, 1961

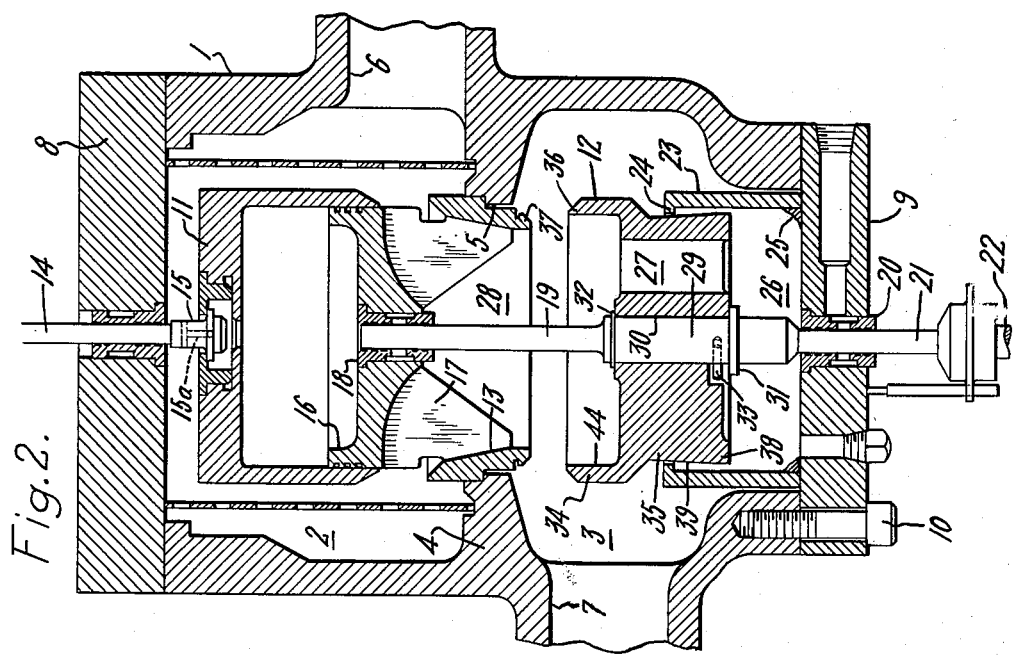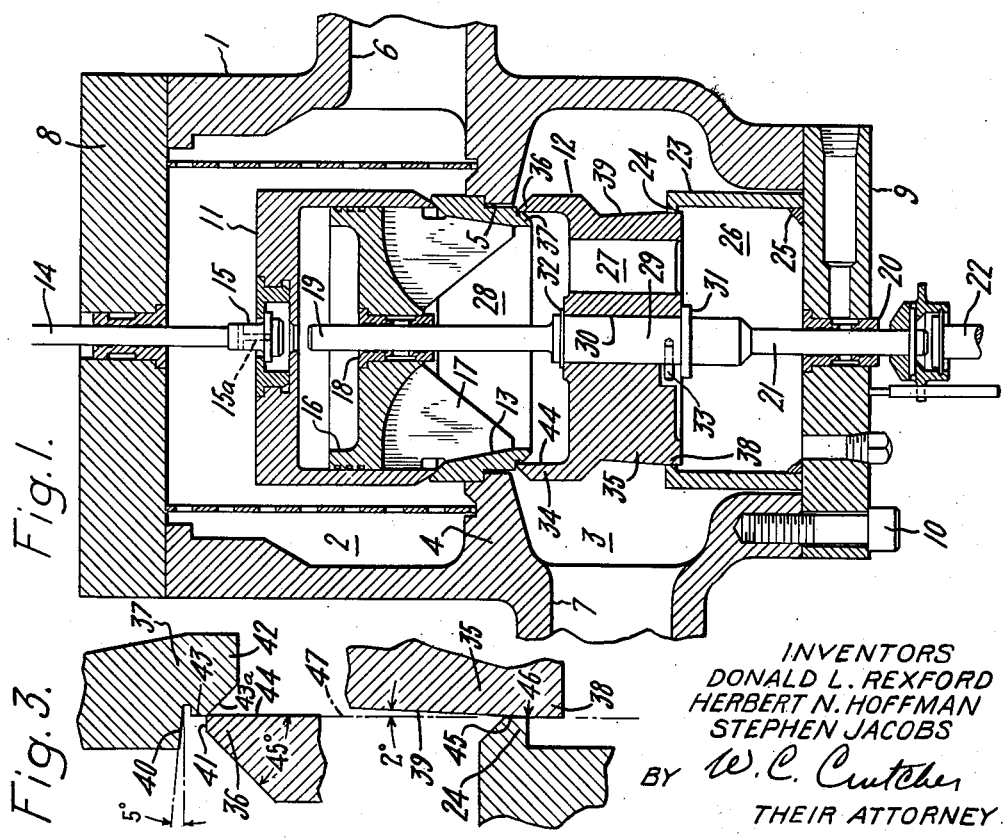
INVENTORS
DONALD L. REXFORD
HERBERT N. HOFFMAN
STEPHEN JACOBS
BY W. C. Crutcher
THEIR ATTORNEY.

2,970,806

BALANCED GOVERNING VALVE WITH MINIMUM REACTION GRADIENTS

Donald L. Rexford, Ashburnham, and Herbert N. Hoffman and Stephen Jacobs, Lunenberg, Mass., assignors to General Electric Company, a corporation of New York Filed Jan. 21, 1960, Ser. No. 3,874

5 Claims. (Cl. 251—210)

This invention relates to an improved balanced governing valve, and more particularly it relates to a governing valve for a steam turbine having an improved valve sleeve configuration in order to provide minimum changes in the reaction of the sleeve throughout its travel and to reduce valve sticking due to deposits of foreign materials from the steam.

A perfectly balanced throttling valve which is still rugged enough to withstand the demands of constant use and to absorb the punishment from foreign substances contained in the fluid which the valve controls has long been the object of search by valve designers. The changing conditions of flow from valve inlet to outlet, the change in pressure ratios across the valve opening, and the change in area of the opening itself, often give rise to local flow disturbances which produce erratic force reactions to movements of the valve sleeve. Moreover, in one range of valve sleeve travel, there may be a positive reaction gradient tending to oppose movement of the sleeve, and in another range of travel there may be a negative gradient tending to aid valve travel. Since the throttling valve sleeve is usually controlled by a governor, the changing reaction gradient in different valve positions may cause poor speed regulation in some positions and complete instability in other positions, with the sleeve refusing to remain at a given opening.

In order to design a throttling valve which may be used with a governor to give good speed regulation at all flow rates, it is not necessary that the sleeve be perfectly balanced to give no net reaction in either direction, but it is very desirable that the bias against the sleeve due to the pressure differences and the steam reaction forces either be constant for all valve openings or that they change at a constant rate or in a straight-line relationship. If this is accomplished in the valve, a spring can be incorporated in the valve sleeve positioning device to counterbalance the sleeve bias. Hence a useful criterion for judging the effectiveness of a throttling valve is the constancy of the gradient of the valve reaction force (or reaction force versus lift), a minimum gradient being most desirable.

Another consideration entering into the design, in order to reduce the net reaction force on the sleeve, is to balance, insofar as possible, the areas of the sleeve exposed to the inlet and outlet pressures. In other words, the projected areas of the valve sleeve on a plane normal to the sleeve axis must balance so that equal projected areas are exposed to the high pressure inlet steam in both axial directions and equal projected areas are exposed to the low pressure outlet steam in both axial directions. If it were possible to do this perfectly, there would be no net axial thrust on the sleeve with perhaps the exception of the force created by fluid pressure acting on the area of the valve stem, depending on the pressures to which the ends of it are exposed. The movable sleeve of such a balanced valve must define together with the housing some sort of pressure chamber in order to carry out this balancing, yet at the same time the sleeve must be freely slidable with respect to the chamber. Therefore, the sleeve must form close clearances with some annular surface through which a minute amount of leakage flow takes place, even when the valve is in its closed position. Some minimum leakage flow must be tolerated in a throttling valve if complete pressure balancing is to be accomplished, and the "leakage flow" is defined as that flow which passes through the valve when it is in its fully closed position. Since in a steam turbine another shut-off valve is generally employed in series with the throttling or governing valve, the leakage flow is not detrimental so long as it is held to a minimum value.

We have discovered that where there are impurities in the elastic fluid, such as boiler compound in the case of steam, the impurities tend to deposit on the low pressure side of a point of throttling. Hence if the sleeve forms close clearances with a member through which there is some leakage flow at all valve positions, deposits tend to form downstream of the clearance gap, and eventually this makes the clearance gap smaller with possible subsequent sticking or binding of the valve sleeve.

Also, solid foreign substances may be present in the elastic fluid, such as weld slag from the steam pipes, which are not removed by the strainer. Accumulation of these foreign substances in the moving parts can also cause binding or scoring.

A combination balanced throttling valve and shut-off valve in a common housing is disclosed in U.S. Patent 2,471,160, issued to William N. Matson and Stephen Jacobs on May 24, 1949, and assigned to the assignee of the present application. In that valve, a guiding internal piston forming close clearances with the movable valve sleeve is exposed directly to the incoming motive fluid which may carry foreign particles. In addition, the sleeve guiding structure is relatively difficult to manufacture and install, inasmuch as it is supported in the valve seat by ribs which must be perfectly aligned with the seat. The gap between the guiding piston and the sleeve is subject to accumulations of boiler compound which deposit on the low pressure side of the clearance gap and which have caused sticking on some occasions.

Another inherent problem in the design of the Matson et al. valve is that the guiding means or rib-supported piston subjects the upper end of the valve stem supporting the sleeve to a variable pressure. The valve stem, although it is exposed to constant atmospheric pressure on one side, is exposed to the outlet chamber pressure of the valve on the other end, which is a variable. Hence an additional, though small, variable component is added to the total valve reaction force.

Accordingly, one object of the present invention is to provide an improved balanced governing valve having minimum reaction forces, with substantially constant gradients in all operating positions.

Another object is to provide a governing valve freely slidable in a balancing chamber with means for reducing the possibility of the valve sticking in the balancing chamber due to foreign deposits in the clearance gap.

Yet another object is to provide a valve having a substantially constant force on the valve stem at all degrees of valve opening.

Another object is to provide an improved combination shut-off and throttling valve with means for collecting foreign particles entrained in the motive fluid.

Still another object is to provide an improved balanced valve sleeve configuration which, in combination with the balancing chamber and the valve seat, substantially balances the axially projected areas of the valve sleeve against both inlet and outlet pressures.

Generally stated, the invention is practiced by providing a valve sleeve which encloses a projecting valve seat at one end of the sleeve and which is enclosed inside a pressure balancing chamber at the other end of the sleeve, the effective areas of the enclosing and the enclosed members being the same. The enclosed end portion of the sleeve is provided with a slight taper to control the effects of deposit formation.

The features of the invention which are believed to be novel are set forth with particularity in the claims appended hereto. The invention itself, however, both as to its organization and method of operation together with further objects and advantages thereof, may best be understood by reference to the following description taken in connection with the accompanying drawing in which:

Fig. 1 is a horizontal elevation drawing in section showing both the shut-off valve and the improved throttling valve in their closed positions;

Fig. 2 is a drawing of the same valve showing both the shut-off and the throttling valve in their open positions; and Fig. 3 is an enlarged detail view of a cross-section of one side of the governing valve sleeve showing the sleeve lip cooperating with the seat and showing the lower portion of the sleeve cooperating with the pressure balancing chamber wall when the valve is at its "cracked," or just-about-to-open position.

Referring now to Fig. 1 of the drawing, a valve housing 1 is divided into an inlet chamber 2 and an outlet chamber 3 by a wall 4 defining an opening 5. Housing 1 also defines an inlet conduit 6 and an outlet conduit 7. Upper and lower housing closure plates 8, 9 complete the housing enclosure and are held in place by suitable means such as the bolt 10 shown on closure plate 9. In inlet chamber 2 is disposed a shut-off valve "cup" or sleeve shown generally at 11 and in outlet chamber 3 is disposed a throttling valve "sleeve" shown generally at 12. Valve sleeves 11, 12 cooperate with sealing surfaces on either end of a common valve seat insert 13 disposed in opening 5 and sealed thereto by suitable means such as welding to the wall 4.

The details of the mechanism for operating the shut-off valve sleeve 11 are not material to the present invention and may, for instance, be as shown in the aforementioned Patent No. 2,471,160. Briefly, however, sleeve 11 is raised or lowered by an operating stem 14 through the pilot valve 15. A guiding piston 16 supported on valve seat 13 by a plurality of radial ribs 17 maintains sleeve 11 in alignment and defines a pressure balancing chamber with the inside of the sleeve. Of more importance to the instant application is the fact that piston member 16 incorporates a central bushing 18 which supports and guides the upper stem 19 of the throttling valve sleeve 12. A similar bushing 20 in lower closure plate 9 supports the lower valve stem 21 of sleeve 12 against transverse movement. Sleeve 12 is positioned, with stem portions 19, 21 sliding in bushings 18, 20, by an operating rod 22 which is connected to a hydraulic operating cylinder (not shown). The details of the operating cylinder are not material to the present invention, but it is generally designed so that a pressure responsive means in the operating cylinder will move in response to varying hydraulic pressures which, in turn, are produced by different speed conditions of the powerplant. The operating cylinder may also include spring means to provide a constant gradient bias which will balance the fluid pressure and reaction forces on the sleeve in various positions, as much as possible.

Disposed in the lower part of outlet chamber 3 is an annular wall member 23 which has an inwardly extending annular rim 24 forming close clearances with sleeve 12. The annular wall 23 is sealed to bottom closure plate 9 by a convenient means such as the weld shown at 25. Wall 23 defines, together with closure plate 9 and sleeve 12, a pressure balancing chamber 26. A number of ports in sleeve 12, such as the one shown at 27, connect pressure balancing chamber 26 with an intermediate chamber 28 defined by the top portion of sleeve 12, the sides of valve seat 13, sleeve 11, and the lower portion of the guiding piston member 16. Sleeve 11 will always be in a fully opened position when valve sleeve 12 is governing, hence the pressure in chamber 28 will be substantially that of housing inlet chamber 2, as will be obvious from an examination of Fig. 2. Ports 27 serve to insure that the pressure in balancing chamber 26 is substantially the same as that in the intermediate chamber 28.

Referring now to the details of the governing valve sleeve 12 and the manner in which it cooperates with valve seat 13 and annular wall 23, it is seen that sleeve 12 is mounted on an enlarged portion 29 of the valve stem by means of a central bore 30 in sleeve 12. Sleeve 12 is retained between a flange 31 and a suitable fastening device such as a snap ring 32 on the valve stem and is prevented from rotating by means of a pin 33.

Sleeve 12 comprises an enlarged diameter hollow cylindrical portion 34 and a reduced diameter substantially cylindrical portion 35. It is to be particularly noted that the inside diameter of the hollow cylindrical portion 34 is substantially equal to the outside diameter of cylindrical portion 35.

Hollow cylindrical portion 34 terminates at its upper end in a beveled lip 36 which encloses and forms a seal with a downwardly extending annular lip 37 on valve seat insert 13. Similarly, the solid cylindrical portion 35 terminates in a smooth cylindrical skirt portion 38 which forms close clearances with the annular edge 24 of annular wall 23.

While Fig. 1 shows the valve in its fully closed position and Fig. 2 shows the valve in a throttling position, the details of the valve sleeve configuration and its cooperating surfaces, which greatly improve the effectiveness of the valve, will be better understood by reference to Fig. 3 of the drawing. There, greatly enlarged portions of the beveled lip 36 cooperating with the valve seat lip 37 and valve skirt portion 38 cooperating with annular lip 24 are shown. The parts are shown when the throttle valve sleeve 12 is in its "cracked" position, which is the point at which minimum "leakage flow" changes to a controlled flow. The valve seat lip 37 defines an annular seating surface 40 which forms a positive seal against steam flow with a flat annular sealing surface 41 on the top of valve sleeve beveled lip 36.

In order to obtain a smooth flow transition from higher pressure to lower pressure, the angle of bevel of lip 36 should be as sharp as possible without reducing the mechanical strength of the edge. It has been found that an angle of 45° gives satisfactory results and the flat edge 41 at the top of the lip should be no larger than is consistent with ease of manufacture, for example on the order of $\frac{1}{64}$ inch.

In order to aid in obtaining a flow versus lift relationship which is as close to a straight line as possible, lip 36 of the valve sleeve cooperates with a secondary lip 42 projecting from lip 37 on the valve seat. Secondary lip 42 defines a closely machined cylindrical surface 43 joining a frusto-conical surface 43a diverging from the inside surface 44 of the valve sleeve. The purpose of frusto-conical surface 43a is to compensate for the effect of changes in the "restriction factor" which occur as a result of decreasing pressure ratio across the orifice. The cylindrical surface 43 of the secondary lip forms close clearances with cylindrical surface 44 on the sleeve. The order of clearance between surfaces 43, 44 varies with the diameter of the valve sleeve, a larger sleeve requiring greater clearance. As an example, however, a valve sleeve with a one inch diameter would require .0025 to .0035 inch clearance, whereas a six inch diameter valve would employ about .0055 to .0065 inch clearance. This will permit a small leakage flow through the annular clearance space from the position shown in Fig. 3 until sleeve 12 is in the fully closed position shown in Fig. 1, with surfaces 40, 41 abutting. A slight bevel of around 5° shown on surface 40 in Fig. 3 serves to eliminate the effect of any pressure imbalance on sleeve 12 due to the area of the small surface 41 on top of the lip 36 when the valve is closed.

Reference to the lower part of Fig. 3 will show that the reduced diameter portion 35 of sleeve 12 includes a cylindrical skirt portion 38 which forms close clearances with the inside cylindrical surface 45 of the annular edge 24. Surfaces 38, 45 are separated by a small clearance gap on the order of .001 to .0035 inch depending on the valve diameter, which means that a small leakage flow will take place through this clearance gap even when the sleeve is in its fully closed position.

In order to control the effects of foreign matter deposit formation, the cylindrical surface 38 merges into a slightly tapering frusto-conical surface 39, with the taper commencing at the arrow 46.

The amount of taper on the frusto-conical surface 39 is very small, perhaps only on the order of 2° from the sleeve axis, and was arrived at by test as being the optimum compromise between the taper required for preventing sticking due to the deposit of impurities such as boiler compound on surface 39 and the maximum deviation which can be tolerated from the true balanced condition of the valve sleeve. It will be apparent that as sleeve 35 moves downward past lip 24, the annular clearance space defined therebetween will begin to open, so that any deposit which has formed on surface 39 will not interfere and cause sticking of sleeve 35 in the lip 24. As shown in Fig. 3, ideally, the transition from cylindrical surface 38 to frusto-conical surface 39 as it passes the lower edge of lip 24, this transition point being shown by arrow 46, takes place just as the upper beveled lip 36 of valve sleeve 12 is in its "cracking position" with the secondary lip 42.

It will also be observed from Fig. 3 that the diameter of inner cylindrical surface 44 is caused to be precisely the same as the outer diameter of the cylindrical skirt surface 38. This is illustrated by the dot-dash reference line 47 passing through both surface 44 and surface 38. Thus, the only portion of valve sleeve 12 having an axially projected unbalanced area exposed to the low pressure in the outlet chamber 3 is the tapered surface 39 above lip 24 and lying to the right of dot-dash line 47 in Fig. 3. An analysis of the static pressure forces on sleeve 12 will show that the tapered portion 39 thus introduces a very slight net axial force in the downward or opening direction due to the fact that the projected area corresponding to the tapered surface 39 below lip 24 (when the sleeve is in an intermediate throttling position) is subjected substantially to inlet chamber pressure, while an equal aligned projected surface above lip 24 is subjected to outlet pressure. However, as previously stated, the presence of a net axial reaction force is not as important as the obtaining of a minimum and preferably constant gradient in the reaction force. Hence, although the projected area of the tapered surface 39 subjected to an unbalanced pressure increases as the valve sleeve 12 moves downward, this is compensated for by the fact that the steam flow is also increasing, with a corresponding drop in pressure ratio between chambers 2 and 3. Hence the pressure difference acting on the "unbalanced" portion of tapered surface 39 is also decreasing, which means that the effect of the increasing unbalanced projected area as the valve opens is offset by the decreasing pressure difference acting on this area. This aids in producing a substantially constant net axial force on sleeve 12 in all operating positions.

The arrangement also achieves automatic compensation for dynamic steam reaction forces on sleeve 12. That is, the acceleration of fluid through the gap between annular lip 24 and valve sleeve portion 35 causes a dynamic reaction on the sleeve. However, when the gap is greatest (when the sleeve is in lowermost position), the pressure difference across the gap causing the fluid to accelerate therethrough is smallest. Hence the taper also aids in reducing or rendering more nearly constant the net forces due to dynamic flow conditions.

Another important feature of the invention is that a substantially constant sleeve bias is aided through the location of the exposed ends of the valve stem portions 19, 21. Certain prior art arrangements have subjected the internal end of the valve stem to varying fluid pressure. Here it will be observed that the lower end of stem 21 is exposed to atmospheric pressure, while the upper end of stem 19 is exposed to the substantially constant pressure of chamber 2 when the stop valve member 11 is opened and governing valve sleeve 12 is controlling the flow. Thus the net unbalanced force imposed on the valve stem due to its cross-section area is rendered substantially constant.

It should also be particularly noted that chamber 26 is generously proportioned to have a greater volume than necessary for the accommodation of the lower part 35 of sleeve 12 so that solid foreign particles entrained in the motive fluid may readily pass downward through the large pressure-balancing ports 27 and collect in the lower part of chamber 26. A volume 50% greater than that necessary to accommodate portion 35 when the valve is full open will allow chamber 26 to receive these foreign particles. This prevents the particles from becoming lodged in the clearance gap between lip 24 and sleeve 12 where they might cause the sleeve to bind.

It should also be noted that the inner cylindrical surface 44 on sleeve 12 should be of substantial axial length, greater than that required merely to accommodate the secondary lip 42 of valve seat 13. This will reduce any dynamic reactive force on the sleeve by the elastic fluid as it passes through the annular orifice between the sleeve and the valve seat. It has been found that for a valve sleeve having an outside diameter on the order of 3 inches the axial length of surface 44 should be at least ¾ inch.

The operation of the improved combination balanced throttling valve and shut-off valve will be apparent from the following description. The shut-off valve sleeve 11 is moved away from valve seat 13 to its fully open position by actuating valve stem 14 and the attached pilot mechanism 15 and elastic fluid flows into intermediate chamber 28. Pilot mechanism 15 causes the pressure on both the top and bottom surfaces of sleeve 11 to be at substantially the pressure of inlet chamber 2 (by reason of pressure balancing passage 15a) and thus the top of valve stem 19 is also subjected to this constant inlet pressure when sleeve 11 is open.

In order to open the throttling valve, operating rod 22 is moved downward, carrying with it valve sleeve 12. The cylindrical surface 43 of secondary lip 42 prevents chattering or any strong reaction forces on the sleeve as the sleeve is moved to its "cracking" position depicted in detail in Fig. 3.

As sleeve 12 is moved further downward, it begins to control or throttle the elastic fluid through the valve opening between secondary lip 42 and the beveled lip 36. Steam flow is also taking place through the clearance gap between annular lip 24 and the bottom portion 35 of the sleeve, this gap increasing in area as the sleeve moves downward. Inasmuch as the outer diameter of the skirt portion 38 is the same as the inner diameter of the hollow cylindrical portion 34, the valve is in almost perfect static balance, with the exception of the net forces due to valve stem area and the tapered portion 39. As explained previously, the criterion for effectiveness is not necessarily a sleeve with no net unbalanced axial force, since either a constant or a uniformly changing bias, with minimum irregularities and no reversals in direction, in different positions is equally effective, since the total net bias can be compensated with springs of known gradient. The various compensating effects described above insure that the total unbalanced axial force on the valve stem will be either constant, or will change at a uniform rate, as a function of valve position.

It is particularly important to note that deposits on the low pressure side of the clearance gap between lip 24 and the sleeve, i.e. the portion of tapered surface 39 above annular edge 24, may form without causing a tendency for the valve to stick, since the clearance is ample at these points. Also, solid foreign particles in the motive fluid may pass through ports 27 to the generously proportioned "settling chamber" 26 and accumulate harmlessly in the lower part thereof, to be removed when the valve is cleaned.

It will be appreciated that the foregoing novel combination of features provides a substantial step toward achieving a throttling valve which is suitable for powerplant governing systems, since a minimum reaction gradient in all positions lends itself to designs with good speed regulation at all valve openings. Also, the absence of "negative gradients," which are difficult to compensate for in a governing system, lends itself to governing stability at all valve openings.

While not limited thereto, the improved governing valve shown is especially suitable for use in a housing containing both a shut-off and a throttling valve, since the only portion of the governing valve passing upward through the valve seat opening separating the housing is the stem member 19 which may be easily contained within the cavity of a downward closing cup-shaped shut-off valve.

The "anti-fouling" features coupled with the placement of the valve seating and pressure balancing surfaces, together with the unique configuration of the valve sleeve described, produce a valve with improved flow coefficients and which provide a reaction versus lift gradient which is substantially closer to a straight line than obtained with similar prior art valves.

While only one embodiment of the invention has been described, it should be understood that it is desired to protect in the following claims all changes or modifications thereto which fall within the spirit and scope of these claims.

What we claim as new and desire to secure by Letters Patent of the United States is:

1. A balanced valve for controlling flow of elastic fluid comprising a housing forming an inlet chamber and an outlet chamber separated by a wall defining a valve seat, a cylindrical lip disposed inwardly from the seat and extending into the outlet chamber, a governing valve sleeve slidably mounted coaxially with said lip and having a first hollow cylindrical portion adapted to enclose said cylindrical lip forming close clearances therewith and disposed to move into sealing engagement with the valve seat, said valve sleeve also including a second reduced diameter portion coaxial with the first portion defining a cylindrical surface on the end of the valve sleeve opposite said first portion having an outside diameter substantially equal to the inside diameter of the first hollow cylindrical portion, the second sleeve portion also defining a frusto-conical surface decreasing in diameter from said cylindrical surface toward the first portion, an annular wall disposed in the outlet chamber and receiving the second portion of the valve sleeve therein to form close clearances with the cylindrical surface of the second sleeve portion, whereby impurities in the elastic fluid may deposit on said frusto-conical surface without impairing the sleeve clearance with said annular wall, said annular wall defining together with the valve sleeve and the housing a pressure balancing chamber, and passage means to maintain the pressure in said balancing chamber substantially at valve inlet pressure.

2. A balanced valve for controlling flow of elastic fluid comprising a housing forming an inlet chamber and an outlet chamber separated by a wall defining an opening, valve seat means disposed in said opening and including a lip portion defining an annular seating surface, said lip portion also including a secondary annular lip disposed inwardly from said seating surface and extending into the outlet chamber, a governing valve sleeve slidably mounted coaxially with the secondary lip portion and having a first hollow cylindrical portion adapted to enclose the secondary lip to form close clearances therewith and terminating in a sleeve lip adapted to sealingly engage said seating surface, said valve sleeve also including a second substantially cylindrical portion of a diameter less than the first sleeve portion and coaxial therewith defining a cylindrical skirt portion on the end of the valve sleeve opposite the sleeve lip having an outside diameter substantially equal to the inside diameter of the first hollow cylindrical portion, the second cylindrical portion also defining a frusto-conical surface decreasing in diameter toward the first hollow cylindrical portion, an annular wall disposed in the outlet chamber receiving the second cylindrical portion of the valve sleeve and defining a cylindrical lip forming close clearances with the cylindrical skirt portion of the second cylindrical sleeve portion, whereby impurities in the elastic fluid may deposit on said frusto-conical surface without blocking the sleeve clearance with the annular wall, said annular wall defining together with the valve sleeve and the housing a pressure balancing chamber, and passage means to maintain the pressure in said balancing chamber substantially at valve inlet pressure.

3. A balanced valve according to claim 2 in which the angle formed by an element of the frusto-conical sleeve surface with the sleeve axis is on the order of two degrees.

4. A balanced governing valve for controlling a flow of elastic fluid comprising a housing forming an inlet chamber and an outlet chamber separated by a wall defining an opening, valve seat means disposed in said opening and including a lip portion extending into the outlet chamber defining an annular seating surface, said lip portion also including a secondary cylindrical lip disposed thereon inwardly from said seating surface and extending further into the outlet chamber, a governing valve sleeve slidably mounted coaxially with the secondary lip portion and having a first hollow cylindrical portion adapted to enclose the secondary lip forming close clearances therewith and terminating in a cylindrical sleeve lip adapted to sealingly engage said seating surface, said valve sleeve also including a second portion of a diameter less than the first sleeve portion and coaxial therewith defining a cylindrical surface on the end of the valve sleeve opposite the sleeve lip having an outside diameter substantially equal to the inside diameter of the first hollow cylindrical portion, the second sleeve portion also defining a frusto-conical surface decreasing in diameter from said cylindrical surface toward the first hollow cylindrical portion, the elements of said frusto-conical surface forming an angle on the order of two degrees with the sleeve axis, first and second valve stem support means mounted above and below the valve sleeve and having openings therein exposed to inlet pressure and atmospheric pressure respectively, first and second coaxial valve stem portions attached above and below the sleeve and slidably mounting the sleeve in said first and second guiding means, whereby the end of the first valve stem is subjected to substantially constant inlet pressure and the end of the second valve stem is subjected to substantially constant atmospheric pressure, an annular wall disposed in the outlet chamber receiving the second portion of the valve sleeve therein and defining an inwardly extending annular lip forming close clearances with the cylindrical surface of the second sleeve portion, whereby impurities in the elastic fluid may deposit on said frusto-conical surface without impairing the sleeve clearance with said annular wall lip, the annular wall defining together with the valve sleeve and the housing a pressure balancing chamber, and passage means to maintain the pressure in said balancing chamber substantially at the valve inlet pressure which means comprises ports defined by the second valve sleeve portion, whereby static and dynamic elastic fluid forces are substantially balanced on both the low pressure and high pressure side of the valve sleeve.

5. A balanced valve according to claim 4 in which the volume of the pressure balancing chamber defined within said annular wall is at least 50% greater than necessary for accommodating the second sleeve portion when the valve is in its fully opened position, whereby foreign particles entrained in elastic fluid passing through the pressure balancing ports settle out and are deposited in said pressure balancing chamber without interfering with the operation of the valve sleeve.

References Cited in the file of this patent

UNITED STATES PATENTS

| | | |
|---|---|---|
| 113,600 | Wanich | Apr. 11, 1871 |
| 1,824,902 | Knauf | Sept. 29, 1931 |
| 2,471,160 | Matson | May 24, 1949 |
| 2,672,158 | Gormany | Mar. 16, 1954 |
| 2,709,451 | La Bour | May 31, 1955 |